US012676430B2

(12) United States Patent
Okazaki

(10) Patent No.: US 12,676,430 B2
(45) Date of Patent: Jul. 7, 2026

(54) TERMINAL COVER AND COVERED TERMINAL

(71) Applicant: YAZAKI CORPORATION, Tokyo (JP)

(72) Inventor: Yutaro Okazaki, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 352 days.

(21) Appl. No.: 18/613,084

(22) Filed: Mar. 21, 2024

(65) Prior Publication Data

US 2024/0332831 A1 Oct. 3, 2024

(30) Foreign Application Priority Data

Apr. 3, 2023 (JP) ................................ 2023-059830

(51) Int. Cl.
*H01R 4/70* (2006.01)
*H01R 11/12* (2006.01)

(52) U.S. Cl.
CPC ............... *H01R 4/70* (2013.01); *H01R 11/12* (2013.01); *H01R 2201/26* (2013.01)

(58) Field of Classification Search
CPC .... H01R 11/12; H01R 13/447; H01R 13/501; H01R 13/506; H01R 2201/26; H01R 4/70
See application file for complete search history.

(56) References Cited

U.S. PATENT DOCUMENTS 12,580,327 B2 * 3/2026 Miwa ........................ H01R 4/18
2024/0113452 A1 * 4/2024 Weaver ................ H01R 4/2433

FOREIGN PATENT DOCUMENTS

EP 2498342 A2 9/2012
EP 3767751 A1 * 1/2021 ............... H01R 4/60
JP 2498342 A2 * 3/2011 ........... H01R 13/501
JP 2012-190703 A 10/2012
WO WO-2022074924 A1 * 4/2022 ............. H01R 13/44

* cited by examiner

*Primary Examiner* — Abdullah A Riyami
*Assistant Examiner* — Thang H Nguyen
(74) *Attorney, Agent, or Firm* — KENEALY VAIDYA LLP

(57) ABSTRACT

A terminal cover includes a base member, a lid member, a center-side locking mechanism, a tip-side locking mechanism, and a guide mechanism. In the tip-side locking mechanism, in a case where a tip-side hook part is displaced with respect to a tip-side claw part in an axial direction when the base member and the lid member are rotated along a rotation direction to be combined, the tip-side hook part interferes with the guide mechanism. The center-side locking mechanism has a movement space part formed in the periphery of a center-side claw part for allowing a center-side hook part to be freely movable in the rotation direction even in a case where the center-side hook part is displaced with respect to the center-side claw part in the axial direction when the base member and the lid member are rotated along the rotation direction to be combined.

5 Claims, 5 Drawing Sheets

TERMINAL COVER AND COVERED TERMINAL

CROSS-REFERENCE TO RELATED APPLICATION(S)

The present application claims priority to and incorporates by reference the entire contents of Japanese Patent Application No. 2023-059830 filed in Japan on Apr. 3, 2023.

BACKGROUND OF THE INVENTION

1. Field of the Invention

The present invention relates to a terminal cover and a covered terminal.

2. Description of the Related Art

As a conventional terminal cover, a terminal protection cover capable of housing a fastening part between a terminal fitting and an end part of an electric wire is described, for example, in Japanese Patent Application Laid-open No. 2012-190703 A. The terminal protection cover includes: a main body part having a housing recessed part capable of housing a terminal fitting; and a lid part that is connected to one sidewall of the main body part via a hinge, which is rotated about the hinge to be moved to an open position to open the housing recessed part and a closed position to close the housing recessed part, and is locked to the other sidewall of the main body part at the closed position. Furthermore, in the terminal protection cover, the main body part is bent along the shape of the terminal fitting and includes a first main body part located on one side bordering the bent part and a second main body part located on the other side. The lid part includes a first lid part connected to the first main body part as well as a second lid part connected to the second main body part, and the first and second lid parts are rotatable in directions intersecting with each other.

The terminal protection cover described in Japanese Patent Application Laid-open No. 2012-190703 A is provided with a locking part on the other sidewall on the opposite side of the hinge side, and the lid part is locked to the other sidewall of the main body part at the closed position. By the way, it is considered that the terminal protection cover has the lid part firmly locked to the main body part by providing a locking part also on the one sidewall on the hinge side. In this case, it is desired to be able to improve operability by smoothly locking the lid part to the main body part.

SUMMARY OF THE INVENTION

The present invention is designed in view of the aforementioned circumstances, and it is an object thereof to provide a terminal cover and a covered terminal capable of improving the operability.

In order to achieve the above mentioned object, a terminal cover according to one aspect of the present invention includes a first cover member and a second cover member capable of housing a connection part of a terminal for an electric wire in a closed state where each of the first cover member and the second cover member is rotated along a rotation direction around a pivot axis to be combined with each other, each of the first cover member and the second cover member including a center-side wall part provided on a center side of a rotation trajectory when being rotated along the rotation direction, and a tip-side wall part provided on a tip side of the rotation trajectory; a hinge that connects the first cover member and the second cover member in a manner capable of being opened and closed in the rotation direction; a center-side locking mechanism including a center-side hook part provided at least on one of the center-side wall parts of the first cover member and the second cover member, and a center-side claw part provided on the other one of the center-side wall parts of the first cover member and the second cover member, the center-side locking mechanism locking the first cover member and the second cover member by hooking the center-side hook part onto the center-side claw part in the closed state; a tip-side locking mechanism including a tip-side hook part provided at least on one of the tip-side wall parts of the first cover member and the second cover member, and a tip-side claw part provided on the other one of the tip-side wall parts of the first cover member and the second cover member, the tip-side locking mechanism locking, together with the center-side locking mechanism, the first cover member and the second cover member by hooking the tip-side hook part onto the tip-side claw part in the closed state; and a guide mechanism that is provided to the tip-side locking mechanism, and guides the tip-side hook part toward the tip-side claw part along the rotation direction when the first cover member and the second cover member are rotated along the rotation direction to be combined, wherein in the tip-side locking mechanism, in a case where the tip-side hook part is not displaced with respect to the tip-side claw part in an axial direction along the pivot axis when the first cover member and the second cover member are rotated along the rotation direction to be combined, the tip-side hook part is guided by the guide mechanism toward the tip-side claw part along the rotation direction, and in a case where the tip-side hook part is displaced with respect to the tip-side claw part in the axial direction, the tip-side hook part interferes with the guide mechanism, and the center-side locking mechanism has a movement space part formed in a periphery of the center-side claw part, the movement space part allowing the center-side hook part to be freely movable in the rotation direction even in a case where the center-side hook part is displaced with respect to the center-side claw part in the axial direction when the first cover member and the second cover member are rotated along the rotation direction to be combined.

In order to achieve the above mentioned object, a covered terminal according to another aspect of the present invention includes a terminal exhibiting conductivity and connected to an electric wire; and a terminal cover capable of housing a connection part of the terminal for the electric wire, wherein the terminal cover includes: a first cover member and a second cover member capable of housing the connection part of the terminal for the electric wire in a closed state where each of the first cover member and the second cover member is rotated along a rotation direction around a pivot axis to be combined with each other, each of the first cover member and the second cover member including a center-side wall part provided on a center side of a rotation trajectory when being rotated along the rotation direction, and a tip-side wall part provided on a tip side of the rotation trajectory; a hinge that connects the first cover member and the second cover member in a manner capable of being opened and closed in the rotation direction; a center-side locking mechanism including a center-side hook part provided at least on one of the center-side wall parts of the first cover member and the second cover member, and a center-side claw part provided on the other one of the center-side wall parts of the first cover member and the second cover member, the center-side locking mechanism locking the first cover member and the second cover member by hooking the center-side hook part onto the center-side claw part in the closed state; a tip-side locking mechanism including a tip-side hook part provided at least on one of the tip-side wall parts of the first cover member and the second cover member, and a tip-side claw part provided on the other one of the tip-side wall parts of the first cover member and the second cover member, the tip-side locking mechanism locking, together with the center-side locking mechanism, the first cover member and the second cover member by hooking the tip-side hook part onto the tip-side claw part in the closed state; and a guide mechanism that is provided to the tip-side locking mechanism, and guides the tip-side hook part toward the tip-side claw part along the rotation direction when the first cover member and the second cover member are rotated along the rotation direction to be combined, in the tip-side locking mechanism, in a case where the tip-side hook part is not displaced with respect to the tip-side claw part in an axial direction along the pivot axis when the first cover member and the second cover member are rotated along the rotation direction to be combined, the tip-side hook part is guided by the guide mechanism toward the tip-side claw part along the rotation direction, and in a case where the tip-side hook part is displaced with respect to the tip-side claw part in the axial direction, the tip-side hook part interferes with the guide mechanism, and the center-side locking mechanism has a movement space part formed in a periphery of the center-side claw part, the movement space part allowing the center-side hook part to be freely movable in the rotation direction even in a case where the center-side hook part is displaced with respect to the center-side claw part in the axial direction when the first cover member and the second cover member are rotated along the rotation direction to be combined.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A mode (embodiment) for embodying the present invention will be described in detail with reference to the accompanying drawings. Note, however, that the present invention is not limited by the contents described in the following embodiment. Furthermore, structural components described hereinafter include those that can be easily conceived by those skilled in the art, or those that are substantially the same. Moreover, the structures described hereinafter can be combined as appropriate. In addition, various omissions, substitutions, or changes of the structures can be made without departing from the scope of the present invention.

Figure 1:
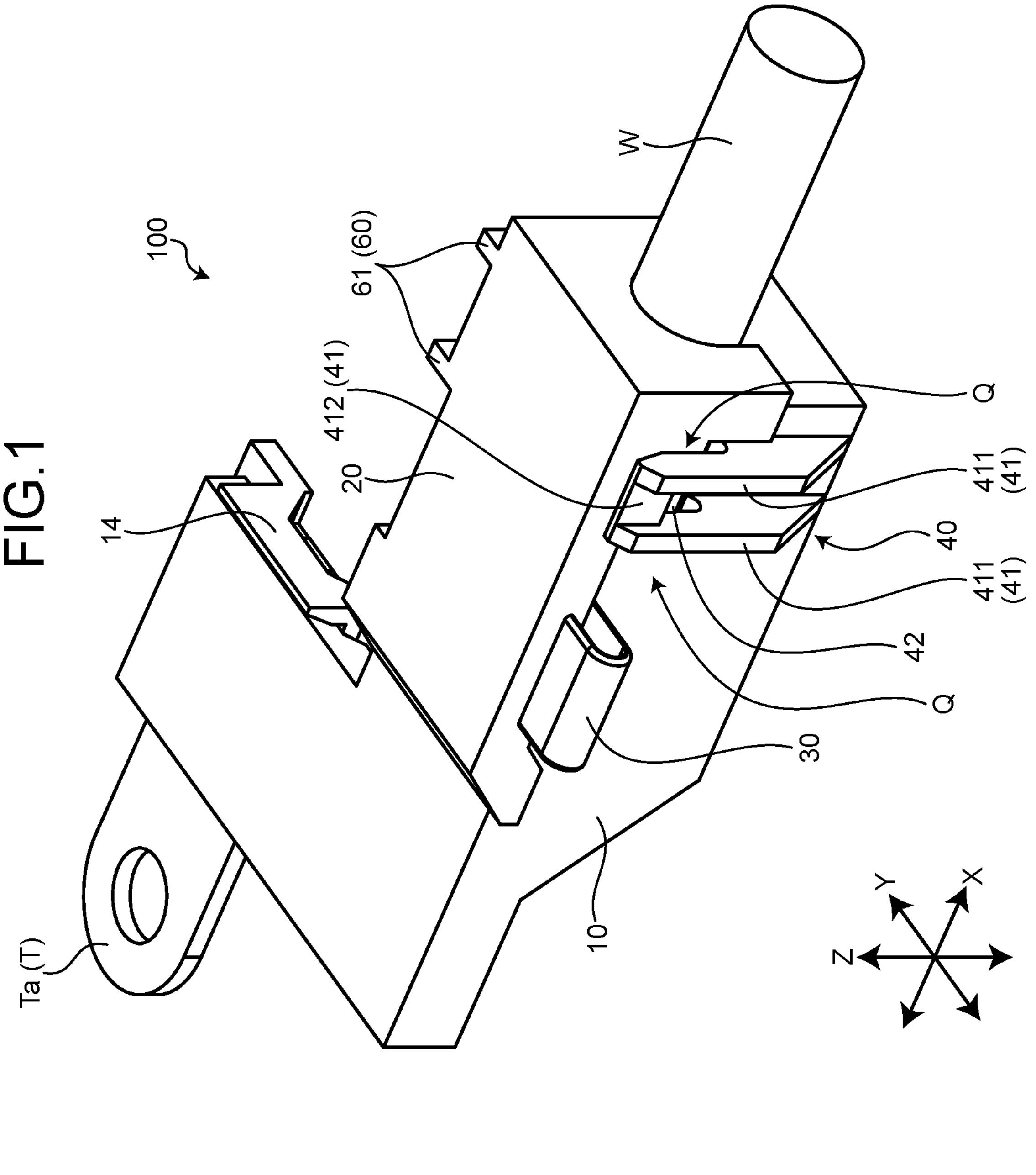
FIG. 1 is a perspective view illustrating a configuration example of a covered terminal according to an embodiment, which is viewed from one side.
Figure 2:
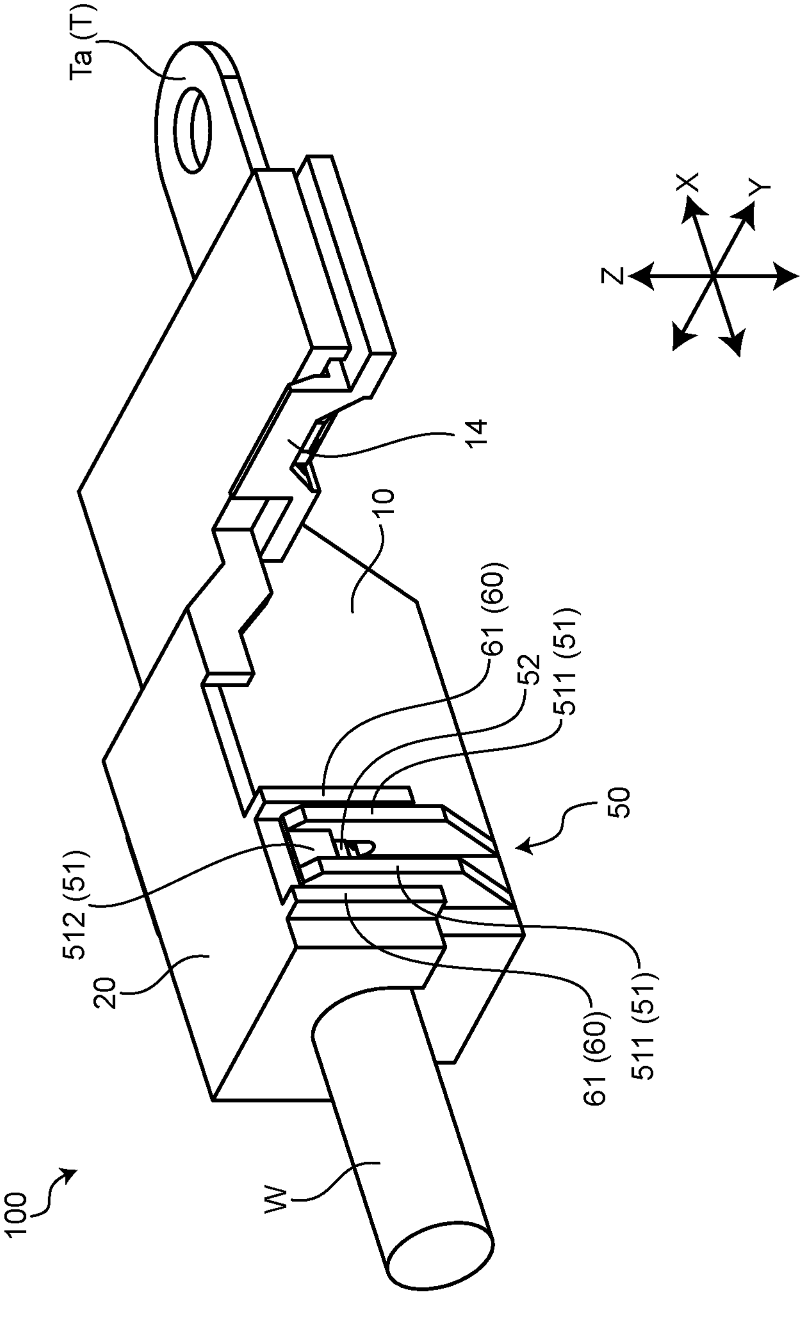
FIG. 2 is a perspective view illustrating a configuration example of the covered terminal according to the embodiment, which is viewed from the other side.
Figure 3:
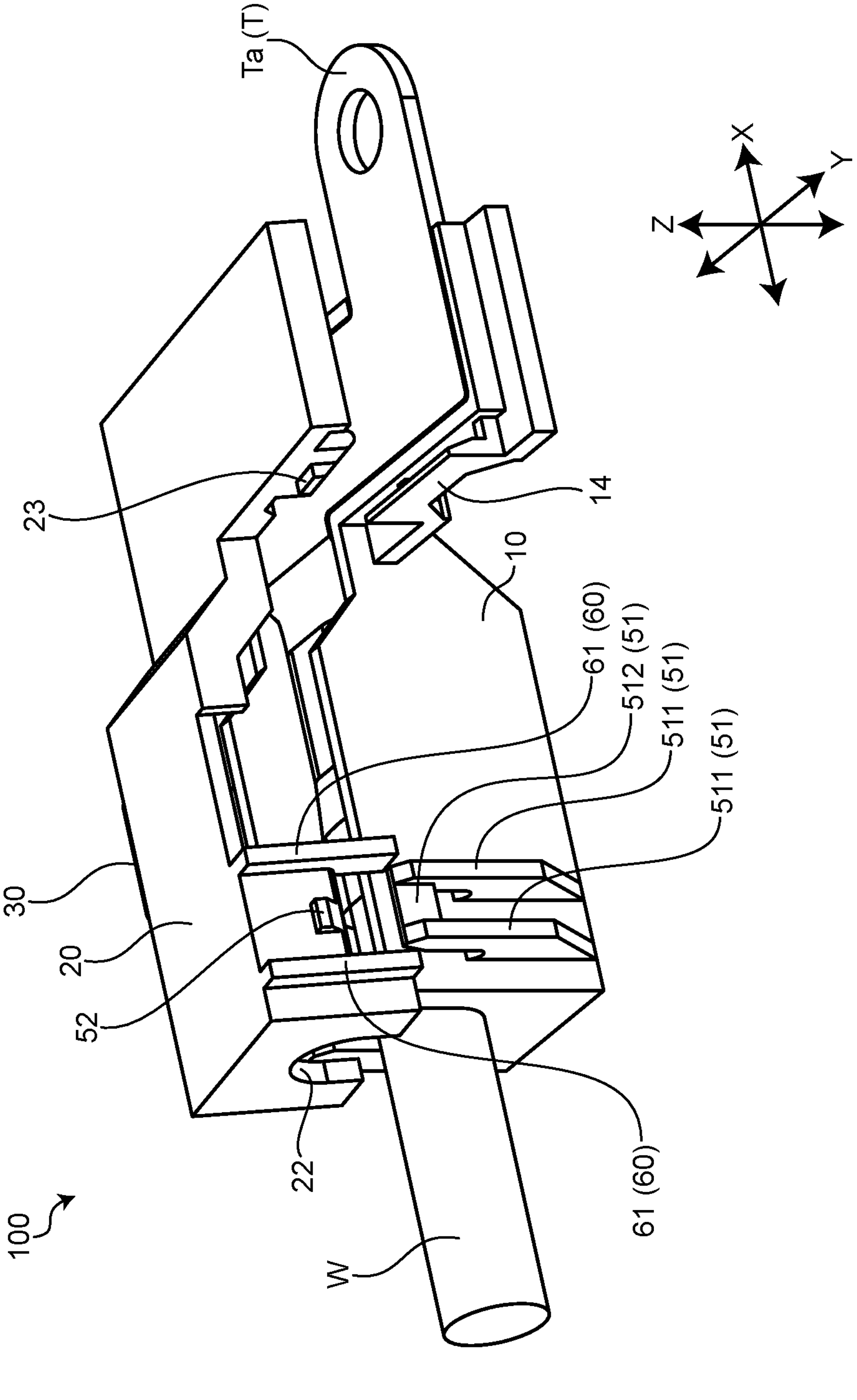
FIG. 3 is a perspective view illustrating a closing motion of the covered terminal according to the embodiment.

A covered terminal 100 according to an embodiment will be described by referring to the drawings. As illustrated in FIG. 1, FIG. 2, and FIG. 3, for example, the covered terminal 100 is electrically connected by being inserted into and tightened and secured to stud bolts of devices and electrical connection components loaded on a vehicle to electrically connects the devices to each other.

In the description hereinafter, in regards to a first direction, a second direction, and a third direction intersecting with each other, the first direction is referred to as an "axial direction X", the second direction as a "width direction Y", and the third direction as a "height direction Z". Herein, the axial direction X, the width direction Y, and the height direction Z intersect with each other, and are typically orthogonal to each other. The axial direction X corresponds to a direction along a pivot axis P to be described later, an extending direction where an electric wire W extends, and the like. The width direction Y and the height direction Z correspond to intersecting directions that intersect with the axial direction X. Furthermore, unless otherwise noted, each of the directions used in the following description represents the direction in a state where components are being mounted to each other.

Figure 4:
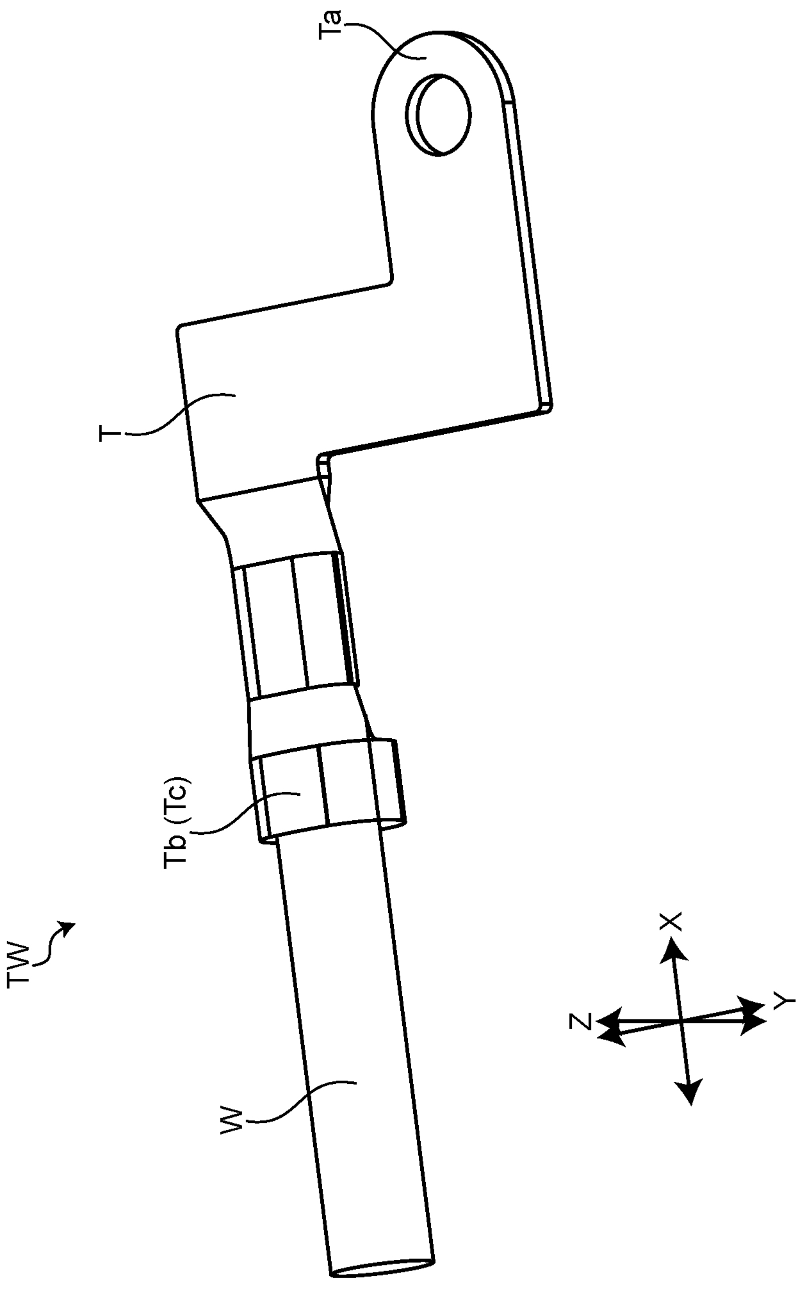
FIG. 4 is a perspective view illustrating a configuration example of a terminal with an electric wire according to the embodiment.
Figure 5:
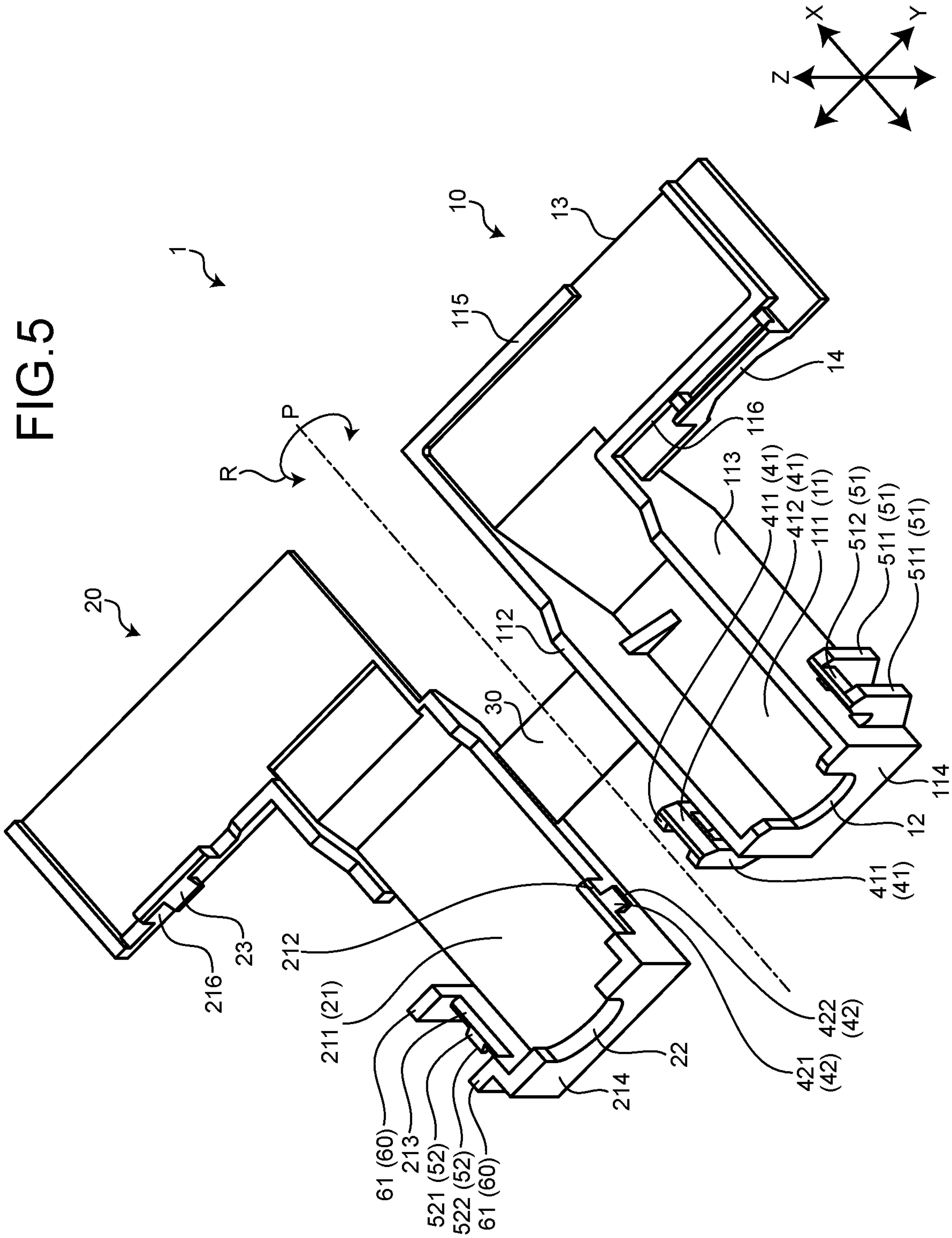
FIG. 5 is a perspective view illustrating a configuration example of a terminal cover according to the embodiment.

As illustrated in FIG. 4 and FIG. 5, for example, the covered terminal 100 includes a wire with terminal TW and a terminal cover 1.

The wire with terminal TW includes an electric wire W and a terminal T, in which the terminal T is connected to the electric wire W.

The electric wire W is, for example, an insulated electric wire in which a core wire formed with a plurality of conductive metal strands bundled together is covered by an insulation coating part. Note that the electric wire W may be a bundle of a plurality of insulated electric wires. At least in one end of the electric wire W, the insulation coating part is stripped off, and the core wire is exposed from the insulation coating part. The electric wire W has the terminal T connected to the core wire exposed from the insulation coating part.

The terminal T is a round (LA) terminal as illustrated in FIG. 4, for example, and includes a mating-side connection part Ta and a crimp part Tb. The mating-side connection part Ta is provided on the tip side of the terminal T, and it is formed in an annular shape. The mating-side connection part Ta, for example, is inserted into a stud bolt, and tightened and secured thereto. The crimp part Tb is provided on the base end side of the terminal T, and it is formed in a cylindrical shape. The crimp part Tb has the core wire that is exposed from the end part of the electric wire W inserted thereinto, and the core wire is crimped and secured thereto to have an electrical connection with the core wire. As described, in the wire with terminal TW, the terminal T and the electric wire W are electrically connected.

The terminal cover 1 is formed with an insulating resin, and houses an electrical wire connection part (connection part) Tc of the terminal T for the electric wire W to protect the wire connection part Tc. The terminal cover 1 houses the terminal T in a state where the mating-side connection part Ta on the tip side of the terminal T is being exposed, for example. More precisely, the terminal cover 1 houses the remaining area of the terminal T excluding the mating-side connection part Ta, that is, the area of the terminal T including the wire connection part Tc on the base end side. In addition, the terminal cover 1 also houses the end part of the electric wire W on the terminal T side, that is, the area that is connected to the wire connection part Tc of the terminal T. As illustrated in FIG. 1, FIG. 2, and FIG. 5, for example, the terminal cover 1 includes a base member 10 as a first cover member, a lid member 20 as a second cover member, a hinge 30, a center-side locking mechanism 40, a tip-side locking mechanism 50, and a guide mechanism 60.

The base member 10 includes a housing part 11, a wire opening part 12, and a terminal opening part 13, as illustrated in FIG. 5.

The housing part 11 is formed in a box shape, and houses the area including the wire connection part Tc of the terminal T in a housing space part on the inner side. The housing part 11 includes a bottom wall 111, a center-side wall part 112, a tip-side wall part 113, a sidewall 114, and a sidewall 115.

The bottom wall 111 is a wall part that extends along the axial direction X and opposes the lid member 20 in the height direction Z.

The center-side wall part 112 is provided on the center side of the rotation trajectory when the base member 10 rotates along a rotation direction R around the pivot axis P, and it is a sidewall part extending along the axial direction X and erected from the bottom wall 111 along the height direction Z toward the lid member 20 side. That is, the center-side wall part 112 is a sidewall part on the inner side of the rotation of the base member 10. In other words, the center-side wall part 112 is a sidewall part that is closer to the hinge 30 side than the tip-side wall part 113 is. Note here that the pivot axis P mentioned above is a virtual pivot axis when the base member 10 rotates about the hinge 30.

The tip-side wall part 113 is provided on the tip side of the rotation trajectory when the base member 10 rotates along the rotation direction R around the pivot axis P, and it is a sidewall part extending along the axial direction X and erected from the bottom wall 111 along the height direction Z toward the lid member 20 side. That is, the tip-side wall part 113 is a sidewall part on the outer side of the rotation of the base member 10. In other words, the tip-side wall part 113 is a sidewall part that is on the opposite side of the hinge 30 side with respect to the center-side wall part 112. The tip-side wall part 113 opposes the center-side wall part 112 in the width direction Y.

The sidewall 114 is a sidewall provided between the center-side wall part 112 and the tip-side wall part 113. The sidewall 114 is located closer to the electric wire W side than the sidewall 115 is in the axial direction X, which extends along the width direction Y and is erected from the bottom wall 111 along the height direction Z toward the lid member 20 side.

The sidewall 115 is provided closer to the terminal T side than the sidewall 114 is in the axial direction X, which is a sidewall part extending along the width direction Y and erected from the bottom wall 111 along the height direction Z toward the lid member 20 side. The sidewall 115 opposes the sidewall 114 in the axial direction X.

As described, the housing part 11 is formed in a box shape with the bottom wall 111, the center-side wall part 112, the tip-side wall part 113, the sidewall 114, and the sidewall 115, and those wall parts form the housing space part that houses the area of the terminal T including the wire connection part Tc.

The wire opening part 12 is an opening part formed in the sidewall 114 on the electric wire W side, and it is formed in a semi-circular shape. The wire opening part 12 forms a circular opening part together with a wire opening part 22 in the lid member 20 in a closed state where the base member 10 and the lid member 20 are combined with each other, and the electric wire W is inserted through the opening part.

The terminal opening part 13 is an opening part formed in the sidewall 115 on the terminal T side, and it is formed in a rectangular shape. The terminal opening part 13 forms a rectangular opening part together with an upper wall 211 of the lid member 20 in the closed state where the base member 10 and the lid member 20 are combined with each other, and the mating-side connection part Ta of the terminal T is inserted through the opening part along the axial direction X and the mating-side connection part Ta is exposed.

As illustrated in FIG. 5, the lid member 20 includes a cover part 21 and the wire opening part 22.

The cover part 21 is formed in a plate shape and closes the opening part of the housing part 11 of the base member 10. The cover part 21 includes the upper wall 211, a center-side wall part 212, a tip-side wall part 213, and a sidewall 214.

The upper wall 211 is a wall part that extends along the axial direction X, and opposes the bottom wall 111 of the lid member 20 in the height direction Z. The upper wall 211 closes the opening part of the housing part 11 of the base member 10 in the closed state where the base member 10 and the lid member 20 are combined with each other.

The center-side wall part 212 is provided on the center side of the rotation trajectory when the lid member 20 rotates along the rotation direction R around the pivot axis P, and it is a sidewall part extending along the axial direction X and erected from the upper wall 211 along the height direction Z toward the base member 10 side. That is, the center-side wall part 212 is a sidewall part on the inner side of the rotation of the lid member 20. In other words, the center-side wall part 212 is a sidewall part that is closer to the hinge 30 side than the tip-side wall part 213 is. The center-side wall part 212 overlaps with the center-side wall part 112 of the base member 10 along the width direction Y in the closed state where the base member 10 and the lid member 20 are combined.

The tip-side wall part 213 is provided on the tip side of the rotation trajectory when the lid member 20 rotates along the rotation direction R around the pivot axis P, and it is a sidewall part erected from the upper wall 211 along the height direction Z toward the base member 10 side. That is, the tip-side wall part 213 is a sidewall part on the outer side of the rotation of the lid member 20. In other words, the tip-side wall part 213 is a sidewall part that is on the opposite side of the hinge 30 side with respect to the center-side wall part 212. The tip-side wall part 213 opposes the center-side wall part 212 in the width direction Y. The tip-side wall part 213 overlaps with the tip-side wall part 113 of the base member 10 along the width direction Y in the closed state where the base member 10 and the lid member 20 are combined.

The sidewall 214 is a sidewall provided between the center-side wall part 212 and the tip-side wall part 213. The sidewall 214 is located closer to the electric wire W side than the sidewall 115 is in the axial direction X, which extends along the width direction Y and is erected from the upper wall 211 along the height direction Z toward the lid member 20 side.

The wire opening part 22 is an opening part formed in the sidewall 214 on the electric wire W side, and it is formed in a semi-circular shape. The wire opening part 22 forms a circular opening part together with the wire opening part 12 in the base member 10 in the closed state where the base member 10 and the lid member 20 are combined with each other, and the electric wire W is inserted through the opening part.

Note that the base member 10 and the lid member 20 are formed in an L-shape to match the shape of the terminal T. The base member 10 includes a main body part along the axial direction X and a bent part bent along the width direction Y to match the L-shape, for example. On a sidewall 116 of the bent part, a hook part 14 is provided. The lid member 20 includes a main body part along the axial direction X and a bent part bent along the width direction Y to match the L-shape. On a sidewall 216 of the bent part, a claw part 23 that is hooked onto the hook part 14 is provided.

The hinge 30 connects the base member 10 and the lid member 20 in a manner capable of being opened and closed in the rotation direction R. The hinge 30 is, for example, in a band-like shape and formed to be elastically deformable. One end of the hinge 30 is connected to the center-side wall part 112 of the base member 10, and the other end thereof is connected to the center-side wall part 212 of the lid member 20. The hinge 30, in accordance with operations of a worker, connects the base member 10 and the lid member 20 to be able to be in a closed state where the base member 10 and the lid member 20 are rotated along the rotation direction R to be combined with each other and in an open state where the base member 10 and the lid member 20 are rotated along the rotation direction R to be opened with each other.

The center-side locking mechanism 40 locks the base member 10 and the lid member 20 on the center side of the rotation trajectory when the base member 10 and the lid member 20 rotate along the rotation direction R around the pivot axis P. The center-side locking mechanism 40 includes a center-side hook part 41 and a center-side claw part 42.

The center-side hook part 41 is a frame-shaped hook. The center-side hook part 41 is provided on the center-side wall part 112 of the base member 10, and includes a pair of arms 411, 411 and a bar member 412.

Each of the pair of arms 411, 411 is formed in an arm shape, extends along the height direction Z, and is provided on the center-side wall part 112 lined along the axial direction X. As for the pair of arms 411, 411, the bar member 412 is provided between one arm 411 and the other arm 411.

The bar member 412 extends along the axial direction X, and it is provided between the pair of arms 411, 411.

The center-side claw part 42 is a claw-shaped protrusion. The center-side claw part 42 is provided on the center-side wall part 212 of the lid member 20, and includes an inclined face 421 and a vertical face 422.

The inclined face 421 is formed by being inclined with respect to the height direction Z. The inclined face 421 abuts against the bar member 412 of the center-side hook part 41 of the base member 10 when the base member 10 and the lid member 20 are rotated and combined, thereby making it easier for the bar member 412 to go over the center-side claw part 42.

The vertical face 422 is formed perpendicular to the height direction Z. The vertical face 422 locks the bar member 412 after the bar member 412 of the center-side hook part 41 of the base member 10 goes over the inclined face 421 when the base member 10 and the lid member 20 are rotated and combined.

The center-side locking mechanism 40 formed in this manner locks the base member 10 and the lid member 20 by hooking the bar member 412 of the center-side hook part 41 onto the center-side claw part 42 in the closed state where the base member 10 and the lid member 20 are rotated along the rotation direction R to be combined with each other.

The tip-side locking mechanism 50 locks the base member 10 and the lid member 20 on the tip side of the rotation trajectory when the base member 10 and the lid member 20 rotate along the rotation direction R around the pivot axis P. The tip-side locking mechanism 50 includes a tip-side hook part 51 and a tip-side claw part 52.

The tip-side hook part 51 is a frame-shaped hook. The tip-side hook part 51 is provided on the tip-side wall part 113 of the base member 10, and includes a pair of arms 511, 511 and a bar member 512.

Each of the pair of arms 511, 511 is formed in an arm shape, extends along the height direction Z, and is provided on the tip-side wall part 113 lined along the axial direction X. As for the pair of arms 511, 511, the bar member 512 is provided between one arm 511 and the other arm 511.

The bar member 512 extends along the axial direction X, and it is provided between the pair of arms 511, 511.

The tip-side claw part 52 is a claw-shaped protrusion. The tip-side claw part 52 is provided on the tip-side wall part 213 of the lid member 20, and includes an inclined face 521 and a vertical face 522.

The inclined face 521 is formed by being inclined with respect to the height direction Z. The inclined face 521 abuts against the bar member 512 of the tip-side hook part 51 of the base member 10 when the base member 10 and the lid member 20 are rotated and combined, thereby making it easier for the bar member 512 to go over the tip-side claw part 52.

The vertical face 522 is formed perpendicular to the height direction Z. The vertical face 522 locks the bar member 512 after the bar member 512 of the tip-side hook part 51 of the base member 10 goes over the inclined face 521 when the base member 10 and the lid member 20 are rotated and combined.

The tip-side locking mechanism 50 formed in this manner locks the base member 10 and the lid member 20 together with the center-side locking mechanism 40 by hooking the bar member 512 of the tip-side hook part 51 onto the tip-side claw part 52 in the closed state where the base member 10 and the lid member 20 are rotated along the rotation direction R to be combined with each other.

The guide mechanism 60 guides the tip-side hook part 51 toward the tip-side claw part 52 along the rotation direction R. The guide mechanism 60 includes a pair of guide wall parts 61, 61. The pair of guide wall parts 61, 61 are provided to the tip-side locking mechanism 50. Each of the pair of guide wall parts 61, 61 is formed in a plate shape, for example, which is located by sandwiching the tip-side claw part 52 therebetween along the axial direction X on the tip-side wall part 213 of the lid member 20, and erected from the tip-side wall part 213 while extending along the height direction Z. The space between the pair of guide wall parts 61, 61 along the axial direction X is set to a space capable of guiding the tip-side hook part 51 on the inner side. The pair of guide wall parts 61, 61 guide the tip-side hook part 51 toward the tip-side claw part 52 along the rotation direction R when the base member 10 and the lid member 20 are rotated along the rotation direction R to be combined.

By the way, the guide mechanism 60 is provided only to the tip-side locking mechanism 50 out of the tip-side locking mechanism 50 and the center-side locking mechanism 40, but not provided to the center-side locking mechanism 40. The reason for this is that, for example, if the guide mechanism 60 is provided to the center-side locking mechanism 40, the guide mechanism 60 comes to guide the center-side hook part 41 on the center side of the rotation trajectory of the base member 10 and the lid member 20, so that it is relatively difficult to align the position when guiding since the stroke for guiding is shorter than the case of guiding on the tip side of the rotation trajectory of the base member 10 and the lid member 20, which may lower the operability.

In a case where the tip-side hook part 51 is not displaced with respect to the tip-side claw part 52 in the axial direction X when the base member 10 and the lid member 20 are rotated along the rotation direction R to be combined, the tip-side locking mechanism 50 can lock the base member 10 and the lid member 20 by guiding the tip-side hook part 51 with the pair of guide inner wall parts 61, 61 along the rotation direction R toward the tip-side claw part 52 and hooking the tip-side hook part 51 onto the tip-side claw part 52.

On the other hand, in the tip-side locking mechanism 50, when the tip-side hook part 51 is displaced with respect to the tip-side claw part 52 in the axial direction X, the tip-side hook part 51 interferes with the pair of guide wall parts 61, 61. When the tip-side hook part 51 interferes with the pair of guide wall parts 61, 61, the tip-side locking mechanism 50 cannot hook the tip-side hook part 51 onto the tip-side claw part 52, and cannot lock the base member 10 and the lid member 20.

Note here that the center-side locking mechanism 40 has a movement space part Q formed in the periphery of the center-side claw part 42, as illustrated in FIG. 1. The movement space part Q is, for example, a region formed on both sides of the center-side claw part 42 in the axial direction X. The movement space part Q is a space that allows the center-side hook part 41 to be freely movable in the rotation direction R even if the center-side hook part 41 is displaced with respect to the center-side claw part 42 in the axial direction X when the base member 10 and the lid member 20 are rotated along the rotation direction R to be combined. That is, the movement space part Q is a space part in which objects, such as the pair of guide wall parts 61, 61, that interfere with the center-side hook part 41 when the center-side hook part 41 is displaced with respect to the center-side claw part 42 in the axial direction X, are not formed. In other words, the center-side wall part 212 of the lid member 20 is formed to be lower than the center-side claw part 42 in the width direction Y in the area where the center-side hook part 41 moves along the rotation direction R, thereby providing the movement space part Q that allows the center-side hook part 41 to be freely movable in the rotation direction R.

In a case where the center-side hook part 41 is not displaced with respect to the center-side claw part 42 in the axial direction X when the base member 10 and the lid member 20 are rotated along the rotation direction R to be combined, the center-side locking mechanism 40 can hook the center-side hook part 41 onto the center-side claw part 42 to lock the base member 10 and the lid member 20.

On the other hand, even if the center-side hook part 41 is displaced with respect to the center-side claw part 42 in the axial direction X when the base member 10 and the lid member 20 are rotated along the rotation direction R to be combined, the center-side locking mechanism 40 can hook the center-side hook part 41 onto the center-side claw part 42 to lock the base member 10 and the lid member 20 since the movement space part Q is formed in the periphery of the center-side claw part 42.

As described above, the terminal cover 1 according to the present embodiment includes the base member 10, the lid member 20, the center-side locking mechanism 40, the tip-side locking mechanism 50, and the guide mechanism 60. The base member 10 and the lid member 20 are capable of housing the wire connection part Tc of the terminal T for the electric wire W in the closed state where the members are rotated along the rotation direction R around the pivot axis P to be combined with each other. The base member 10 and the lid member 20 include the center-side wall parts 112, 212 provided on the center side of the rotation trajectory when rotated along the rotation direction R, and the tip-side wall parts 113, 213 provided on the tip side of the rotation trajectory. The hinge 30 connects the base member 10 and the lid member 20 in a manner capable of being opened and closed in the rotation direction R. The center-side locking mechanism 40 includes the center-side hook part 41 provided on the center-side wall part 112 of the base member 10 and the center-side claw part 42 provided on the center-side wall part 212 of the lid member 20, and locks the base member 10 and the lid member 20 by hooking the center-side hook part 41 onto the center-side claw part 42 in the closed state where the base member 10 and the lid member 20 are rotated along the rotation direction R to be combined with each other. The tip-side locking mechanism 50 includes the tip-side hook part 51 provided on the tip-side wall part 113 of the base member 10 and the tip-side claw part 52 provided on the tip-side wall part 213 of the lid member 20, and locks the base member 10 and the lid member 20 together with the center-side locking mechanism 40 by hooking the tip-side hook part 51 onto the tip-side claw part 52 in the closed state where the base member 10 and the lid member 20 are rotated along the rotation direction R to be combined with each other. The guide mechanism 60 is provided to the tip-side locking mechanism 50, and guides the tip-side hook part 51 toward the tip-side claw part 52 along the rotation direction R when the base member 10 and the lid member 20 are rotated along the rotation direction R to be combined. In the above configuration, in a case where the tip-side hook part 51 is not displaced with respect to the tip-side claw part 52 in the axial direction X along the pivot axis P in the tip-side locking mechanism 50 when the base member 10 and the lid member 20 are rotated along the rotation direction R to be combined, the tip-side hook part 51 is guided by the guide mechanism 60 along the rotation direction R toward the tip-side claw part 52. In a case where the tip-side hook part 51 is displaced with respect to the tip-side claw part 52 in the axial direction X, the tip-side hook part 51 interferes with the guide mechanism 60. The center-side locking mechanism 40 has the movement space part Q formed in the periphery of the center-side claw part 42 for allowing the center-side hook part 41 to be freely movable in the rotation direction R even if the center-side hook part 41 is displaced with respect to the center-side claw part 42 in the axial direction X when the base member 10 and the lid member 20 are rotated along the rotation direction R to be combined.

With this configuration, the terminal cover 1 can suppress the interference between the tip-side hook part 51 and the tip-side claw part 52 by guiding the tip-side hook part 51 with the guide mechanism 60, thereby making it possible to smoothly lock the tip-side hook part 51 to the tip-side claw part 52. In this case, the terminal cover 1 has the guide mechanism 60 provided only to the tip-side locking mechanism 50 but not to the center-side locking mechanism 40. Note here that, for example, if the guide mechanism 60 is provided to the center-side locking mechanism 40, the guide mechanism 60 comes to guide the center-side hook part 41 on the center side of the rotation trajectory of the base member 10 and the lid member 20, so that it is relatively difficult to align the position when guiding since the stroke for guiding is shorter than the case of guiding on the tip side of the rotation trajectory of the base member 10 and the lid member 20, which may lower the operability. In contrast, the terminal cover 1 has the guide mechanism 60 provided only to the tip-side locking mechanism 50 but not to the center-side locking mechanism 40, so that a long stroke can be secured. This makes it easy to align the position when guiding, thereby improving the operability. In addition, since the terminal cover 1 has the guide mechanism 60 provided only to the tip-side locking mechanism 50, it is easier to perform visual check during operations and to align the position when guiding compared to the case where the guide mechanism 60 is provided to the center-side locking mechanism 40. Therefore, the operability can be improved.

As described above, in the terminal cover 1, the guide mechanism 60 is provided only to the tip-side locking mechanism 50 out of the tip-side locking mechanism 50 and the center-side locking mechanism 40, so that the operability can be improved.

In the terminal cover 1 described above, the guide mechanism 60 includes the pair of guide wall parts 61, 61 that are erected in the tip-side wall part 213 at positions sandwiching the tip-side claw part 52 along the axial direction X to guide the tip-side hook part 51 toward the tip-side claw part 52 along the rotation direction R. In the tip-side locking mechanism 50, in a case where the tip-side hook part 51 is displaced with respect to the tip-side claw part 52 in the axial direction X when the base member 10 and the lid member 20 are combined by being rotated along the rotation direction R, the tip-side hook part 51 interferes with the pair of guide wall parts 61, 61. With this configuration, the terminal cover 1 can suppress the interference between the tip-side hook part 51 and the tip-side claw part 52 by guiding the tip-side hook part 51 with the pair of guide wall parts 61, 61, thereby making it possible to smoothly lock the tip-side hook part 51 to the tip-side claw part 52. As a result, the operability can be improved.

The covered terminal 100 includes the wire with terminal TW in which the terminal T is connected to the electric wire W, and the terminal cover 1 capable of housing the wire connection part Tc of the terminal T for the electric wire W, so that the operability can be improved.

In the above description, the center-side locking mechanism 40 is described by referring to the example where the center-side hook part 41 is provided on the center-side wall part 112 of the base member 10 and the center-side claw part 42 is provided on the center-side wall part 212 of the lid member 20. However, the configuration thereof is not limited thereto, and the center-side claw part 42 may be provided on the center-side wall part 112 of the base member 10, and the center-side hook part 41 may be provided on the center-side wall part 212 of the lid member 20, for example.

Furthermore, while the tip-side locking mechanism 50 is described by referring to the example where the tip-side hook part 51 is provided on the tip-side wall part 113 of the base member 10 and the tip-side claw part 52 is provided on the tip-side wall part 213 of the lid member 20, the configuration thereof is not limited thereto. For example, the tip-side claw part 52 may be provided on the tip-side wall part 113 of the base member 10, and the tip-side hook part 51 may be provided on the tip-side wall part 213 of the lid member 20. In this case, the pair of guide wall parts 61, 61 are erected at positions to sandwich the tip-side claw part 52 along the axial direction X in the tip-side wall part 113 of the base member 10.

Furthermore, while the guide mechanism 60 is described by referring to the example having the pair of guide wall parts 61, 61 as a configuration example of guiding the tip-side hook part 51 to the tip-side claw part 52, other configurations different from the pair of guide wall parts 61, 61 may be used to guide the tip-side hook part 51 to the tip-side claw part 52.

Moreover, while the terminal T is described by referring to the example of being a round (LA) terminal, the terminal T is not limited thereto. For example, any other terminals such as an open-tip terminal with a U-shaped tip and the like may be used.

The terminal cover and the covered terminal according to the present embodiment can smoothly lock the tip-side hook part to the tip-side claw part by guiding the tip-side hook part with the guide mechanism. In this case, the terminal cover and the covered terminal have the guide mechanism provided only to the tip-side locking mechanism but not to the center-side locking mechanism. Note here that, for example, if the guide mechanism is provided to the center-side locking mechanism, the guide mechanism comes to guide the center-side hook part on the center side of the rotation trajectory of the first and second cover members. Therefore, in this case, it is more difficult to align the position when guiding since the stroke for guiding is shorter than the case of guiding on the tip side of the rotation trajectory of the first and second cover members, which may lower the operability. In contrast, the terminal cover and the covered terminal have the guide mechanism provided only to the tip-side locking mechanism but not to the center-side locking mechanism, so that a long stroke can be secured. This makes it easy to align the position when guiding, thereby improving the operability.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal cover comprising:

a first cover member and a second cover member capable of housing a connection part of a terminal for an electric wire in a closed state where each of the first cover member and the second cover member is rotated along a rotation direction around a pivot axis to be combined with each other, each of the first cover member and the second cover member including a center-side wall part provided on a center side of a rotation trajectory when being rotated along the rotation direction, and a tip-side wall part provided on a tip side of the rotation trajectory;

a hinge that connects the first cover member and the second cover member in a manner capable of being opened and closed in the rotation direction;

a center-side locking mechanism including a center-side hook part provided at least on one of the center-side wall parts of the first cover member and the second cover member, and a center-side claw part provided on the other one of the center-side wall parts of the first cover member and the second cover member, the center-side locking mechanism locking the first cover member and the second cover member by hooking the center-side hook part onto the center-side claw part in the closed state;

a tip-side locking mechanism including a tip-side hook part provided at least on one of the tip-side wall parts of the first cover member and the second cover member, and a tip-side claw part provided on the other one of the tip-side wall parts of the first cover member and the second cover member, the tip-side locking mechanism locking, together with the center-side locking mechanism, the first cover member and the second cover member by hooking the tip-side hook part onto the tip-side claw part in the closed state; and a guide mechanism that is provided to the tip-side locking mechanism, and guides the tip-side hook part toward the tip-side claw part along the rotation direction when the first cover member and the second cover member are rotated along the rotation direction to be combined, wherein in the tip-side locking mechanism, in a case where the tip-side hook part is not displaced with respect to the tip-side claw part in an axial direction along the pivot axis when the first cover member and the second cover member are rotated along the rotation direction to be combined, the tip-side hook part is guided by the guide mechanism toward the tip-side claw part along the rotation direction, and in a case where the tip-side hook part is displaced with respect to the tip-side claw part in the axial direction, the tip-side hook part interferes with the guide mechanism, and the center-side locking mechanism has a movement space part formed in a periphery of the center-side claw part, the movement space part allowing the center-side hook part to be freely movable in the rotation direction even in a case where the center-side hook part is displaced with respect to the center-side claw part in the axial direction when the first cover member and the second cover member are rotated along the rotation direction to be combined.

2. The terminal cover according to claim 1, wherein the guide mechanism is provided only to the tip-side locking mechanism out of the tip-side locking mechanism and the center-side locking mechanism.

3. The terminal cover according to claim 1, wherein the guide mechanism includes a pair of guide wall parts that are erected at positions sandwiching the tip-side claw part along the axial direction in the tip-side wall part for guiding the tip-side hook part toward the tip-side claw part along the rotation direction, and in the tip-side locking mechanism, the tip-side hook part interferes with the pair of guide wall parts in a case where the tip-side hook part is displaced with respect to the tip-side claw part in the axial direction when the first cover member and the second cover member are combined by being rotated along the rotation direction.

4. The terminal cover according to claim 2, wherein the guide mechanism includes a pair of guide wall parts that are erected at positions sandwiching the tip-side claw part along the axial direction in the tip-side wall part for guiding the tip-side hook part toward the tip-side claw part along the rotation direction, and in the tip-side locking mechanism, the tip-side hook part interferes with the pair of guide wall parts in a case where the tip-side hook part is displaced with respect to the tip-side claw part in the axial direction when the first cover member and the second cover member are combined by being rotated along the rotation direction.

5. A covered terminal comprising:

a terminal exhibiting conductivity and connected to an electric wire; and a terminal cover capable of housing a connection part of the terminal for the electric wire, wherein the terminal cover includes:

a first cover member and a second cover member capable of housing the connection part of the terminal for the electric wire in a closed state where each of the first cover member and the second cover member is rotated along a rotation direction around a pivot axis to be combined with each other, each of the first cover member and the second cover member including a center-side wall part provided on a center side of a rotation trajectory when being rotated along the rotation direction, and a tip-side wall part provided on a tip side of the rotation trajectory;

a hinge that connects the first cover member and the second cover member in a manner capable of being opened and closed in the rotation direction;

a center-side locking mechanism including a center-side hook part provided at least on one of the center-side wall parts of the first cover member and the second cover member, and a center-side claw part provided on the other one of the center-side wall parts of the first cover member and the second cover member, the center-side locking mechanism locking the first cover member and the second cover member by hooking the center-side hook part onto the center-side claw part in the closed state;

a tip-side locking mechanism including a tip-side hook part provided at least on one of the tip-side wall parts of the first cover member and the second cover member, and a tip-side claw part provided on the other one of the tip-side wall parts of the first cover member and the second cover member, the tip-side locking mechanism locking, together with the center-side locking mechanism, the first cover member and the second cover member by hooking the tip-side hook part onto the tip-side claw part in the closed state; and a guide mechanism that is provided to the tip-side locking mechanism, and guides the tip-side hook part toward the tip-side claw part along the rotation direction when the first cover member and the second cover member are rotated along the rotation direction to be combined, in the tip-side locking mechanism, in a case where the tip-side hook part is not displaced with respect to the tip-side claw part in an axial direction along the pivot axis when the first cover member and the second cover member are rotated along the rotation direction to be combined, the tip-side hook part is guided by the guide mechanism toward the tip-side claw part along the rotation direction, and in a case where the tip-side hook part is displaced with respect to the tip-side claw part in the axial direction, the tip-side hook part interferes with the guide mechanism, and the center-side locking mechanism has a movement space part formed in a periphery of the center-side claw part, the movement space part allowing the center-side hook part to be freely movable in the rotation direction even in a case where the center-side hook part is displaced with respect to the center-side claw part in the axial direction when the first cover member and the second cover member are rotated along the rotation direction to be combined.

* * * * *